O.C.Phelps,
Cock,
Nº 10,640, Patented Mar.14, 1854.
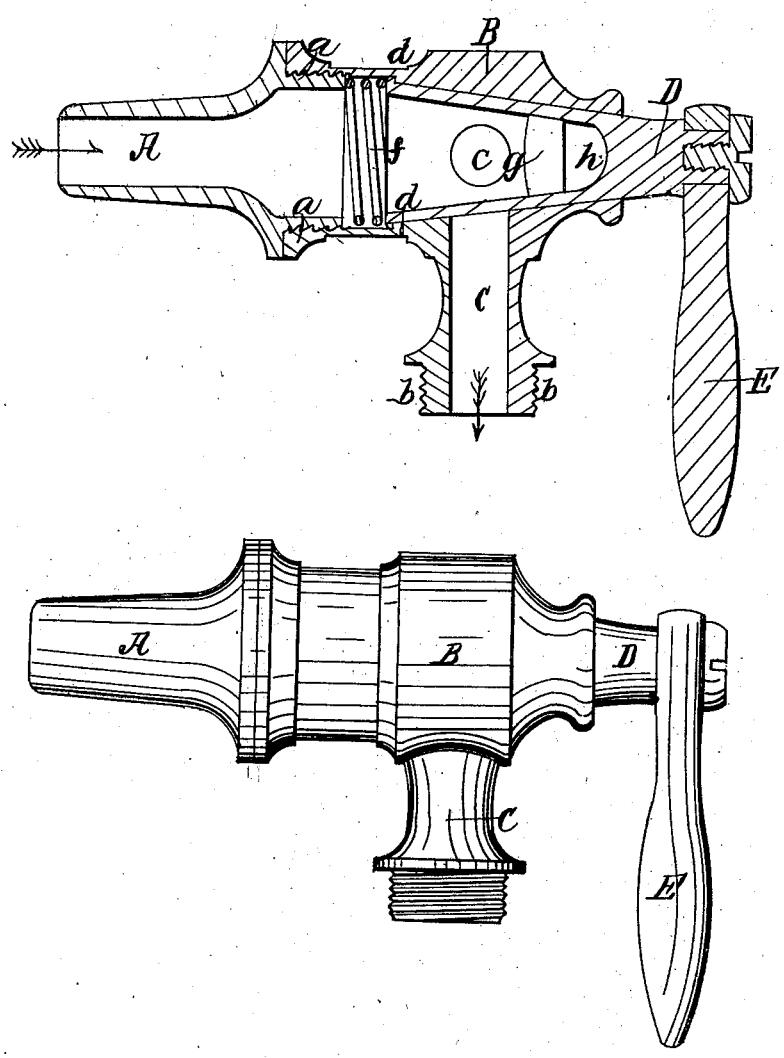

UNITED STATES PATENT OFFICE.

O. C. PHELPS, OF BOSTON, MASSACHUSETTS.

STOP-COCK.

Specification of Letters Patent No. 10,640, dated March 14, 1854.

*To all whom it may concern:*

Be it known that I, ORSON C. PHELPS, of Boston, county of Suffolk, and State of Massachusetts, have invented a new and useful Improvement in Cocks; and I hereby declare the following to be a full, clear, and exact description of the same, reference being had to the annexed drawings, making part of this specification, in which—

Figure 1 is a view and Fig. 2 a longitudinal section through the cock.

It has always been desirable to make use of conical in lieu of cylindrical plugs, as the latter when used without packing are liable to leak after becoming slightly worn. The conical plug, on the contrary, sinks deeper into its socket as it wears, and remains continually tight. This form of plug, however, is liable to the objection that in times of extreme cold it is liable to be forced too far into its socket and become jammed therein, so as to require considerable force or a blow to remove it; the repetition of this oftentimes strains and bursts the cock.

To remedy this defect is the object of my improvement, which consists in furnishing the cone at its base with a flange which is made to bear upon a suitable ledge in the body of the cock, and prevents the plug from sinking too deep into the socket however much it may be contracted by cold.

My second improvement consists in the adaptation to the interior of the conical plug of an air cushion for the purpose of neutralizing the effects of the water hammer.

To enable others skilled in the art to make and use my invention I will proceed to describe its construction and operation.

A is the portion of the cock which is soldered to the water pipe, and which is secured to the body of the cock B by a screw at $a$.

C is the eduction pipe from the cock, to which the fitter is attached by means of the screw $b$.

D is the conical plug having an opening at $c$ corresponding in position and size with the delivery pipe C. At $d$ is a flange projecting from the base of the conical plug and resting upon a corresponding ledge in the body of the cock. The plug is kept in place by the spring $f$, which may be of wire, india rubber or other suitable substance, and which is forced up by the action of screwing the piece A of the cock into place.

$g$ is a plug or disk of india rubber which is forced into the plug beyond the hole $c$. A portion of air $h$ being confined beyond the india rubber. As the wear upon the flange $d$ will always be at least equal to the wear upon any other portion of the surface of the cone (the diameter of the flange being greater than that of the cone) it is evident that it can never prevent the cone from having a full bearing upon its socket, while it will prevent it from sinking too deep therein when contracted by extreme cold. The india rubber $g$ and the space of air $h$ beyond it operate as a cushion to prevent the consequences of the water hammer.

E is the handle by which the conical plug is turned. It will be perceived that the pressure of the water tends to keep the plug constantly in place while its bearing surfaces are entirely removed from exposure to grit.

What I claim as my invention and desire to secure by Letters Patent is—

1. The flange $d$ in combination with the conical plug constructed and operating as described for the purpose set forth.

2. I claim the air-cushion within the plug constructed and arranged in the manner and for the purpose substantially as described.

O. C. PHELPS.

Witnesses:
SAM COOPER,
JNO. MURDOCK.